United States Patent [19]

Penny

[11] Patent Number: 4,960,527

[45] Date of Patent: Oct. 2, 1990

[54] DELAYED CROSSLINKING OF GUAR GELLING AGENTS WITH CERIC SALTS

[75] Inventor: Glenn S. Penny, Duncan, Okla.

[73] Assignee: Rhone-Poulenc, Inc., Monmouth Junction, N.J.

[21] Appl. No.: 368,403

[22] Filed: Jun. 19, 1989

Related U.S. Application Data

[63] Continuation-in-part of Ser. No. 79,682, Jul. 30, 1987, abandoned.

[51] Int. Cl.$^5$ ............................................. E21B 43/26
[52] U.S. Cl. ............................. 252/8.551; 252/315.3
[58] Field of Search ......................... 252/8.551, 315.3

[56] References Cited

U.S. PATENT DOCUMENTS

| | | | |
|---|---|---|---|
| 3,919,015 | 11/1975 | Bolza | 149/42 |
| 4,018,286 | 4/1977 | Gall et al. | 166/294 |
| 4,021,355 | 5/1977 | Holtmyer et al. | 252/8.551 |
| 4,462,917 | 7/1984 | Conway | 252/8.55 R |
| 4,470,915 | 9/1984 | Conway | 252/8.55 R |
| 4,477,360 | 10/1984 | Almond | 252/8.55 R |
| 4,502,967 | 3/1985 | Conway | 252/8.55 R |
| 4,505,826 | 3/1985 | Horton | 252/8.551 |
| 4,579,670 | 4/1986 | Payne | 252/8.551 |
| 4,657,081 | 4/1987 | Hodge | 252/8.551 |

OTHER PUBLICATIONS

Handbook of Chemistry and Physics, thirty-fifth edition, 1953, p. 1624, Garrett et al.
*Chemistry: A Study of Matter,* 2nd. Edition, Pub. 1972, by Xerox Corp., p. 402.

*Primary Examiner*—Robert L. Stoll
*Assistant Examiner*—Chhaya Sayala
*Attorney, Agent, or Firm*—Bill D. McCarthy; Glen M. Burdick

[57] ABSTRACT

An improved fracturing fluid for use in hydraulic fracturing of subterranean formations and comprising an aqueous fluid containing an effective amount of a guar containing gelling agent, an effective amount of a crosslinking agent to crosslink the gelling agent and a retarding agent for delaying the crosslinking reaction. The crosslinking agent is a rare earth metal containing compound, such as a ceric salt. The retarding agent for the ceric salt comprises a first mixture consisting essentially of about 1 part of a carboxylic acid and from about 1 to 1000 parts of the alkali metal salt of the carboxylic acid. The retarding agent further comprises a second mixture consisting essentially of about 1 part of a hydroxycarboxylic acid and from about 1 to 1000 parts of its alkali metal salt or about 1 part of an aminocarboxylic acid to from about 1 to 1000 parts of its alkali metal salt.

29 Claims, No Drawings

DELAYED CROSSLINKING OF GUAR GELLING AGENTS WITH CERIC SALTS

CROSS REFERENCE TO RELATED APPLICATION

This is a continuation-in-part application of co-pending patent application entitled "METHOD AND COMPOSITION FOR DELAYING CROSSLINKING OF GUAR GELLING AGENTS" (as amended), U.S. Ser. No. 07/079,682, filed July 30, 1987, now abandoned.

BACKGROUND OF THE INVENTION

The present invention relates generally to compositions employed in the hydraulic fracturing of subterranean formations, and more particularly, but not by way of limitation, to controllably delaying the crosslinking of guar containing gelling agents with crosslinking agents containing cerium wherein the cerium has a +4 oxidation state.

BRIEF DESCRIPTION OF THE PRIOR ART

In the production of hydrocarbons from subterranean formations, it is common practice to hydraulically fracture the formation to improve hydrocarbon recovery. The fracturing fluid is introduced into the subterranean formation via the well bore at a rate and pressure sufficient to produce fractures in the formation and to extend the fractures so formed from the well bore into the formation. The fluids employed to hydraulically fracture a subterranean formation will desirably have relatively low initial viscosities and low friction pressures when pumped, but high viscosities in the formation due to a crosslinking reaction between a gelling agent and a crosslinking agent.

While the use of high viscosity fracturing fluids is desirable in the fracturing of a subterranean formation, problems are nevertheless encountered in the use of such high viscosity fracturing fluids due to the high friction losses encountered during the introduction of the fluid into the subterranean formation. That is, because the pumping equipment and auxiliary equipment used in the delivery of the fracturing fluids to the subterranean formation are limited as to capacity and operating pressure, the viscosity of the fracturing fluid which can be pumped is also limited.

In an effort to overcome these problems, numerous compositions and systems have heretofore been proposed in the art to delay the crosslinking of the gelling agent so that the viscosity of the fracturing fluid can be maintained low and excessive friction losses and high well head pumping pressures are substantially eliminated, while at the same time permitting the desired crosslinking to occur in the subterranean formations so that the desired high viscosity of the fracturing fluid can be achieved in the formation.

Typical of such systems which have heretofore been proposed to retard the crosslinking of a gel are those disclosed in U.S. Pat. Nos. 4,462,917 and 4,502,967. Each of the before-identified patents discloses an aqueous gel containing a retarded crosslinking composition comprising an organotitanate chelate, a polyhydroxyl-containing compound and an aqueous fluid. The gel, which has a high viscosity in a subterranean formation and pumping characteristics in turbulent flow similar to those of the base gel, is useful for fracturing and placing proppant agents within the subterranean formation.

U.S. Pat. No. 4,477,360 discloses an aqueous gel containing a retarded crosslinking composition which comprises a zirconium salt or chelate, a polyhydroxyl-containing compound, and optionally an aqueous fluid or alkanol; and U.S. Pat. No. 4,470,915 discloses an aqueous gel containing a crosslinking agent and a polyhydroxycarboxylic acid retarding agent having from 3 to 7 carbon atoms.

U.S. Pat. No. 3,919,015 discloses a stable gelled water bearing composition comprising a water-soluble inorganic oxygen-releasing salt, a fuel, water and a gum. The gum is selected from the group consisting of galactomannans and xanthans which are prepared by crosslinking the gum in situ at a pH of 3-8 with a soluble crosslinking agent selected from at least one of the group consisting of compounds of elements of atomic numbers 58, 59, 60 and 62-71. One of such crosslinking agents is disclosed as a compound of cerium wherein the valence of the cerium is +4. The references further disclose that a reaction mixture formed of the aforementioned gums, water and rare earth compound crosslinking agents (as the sole constituents) can be used in drilling muds.

The chemistry of the rare earth metals, such as cerium, is completely different and distinct from the chemistry of other metals, such as the transition metals and alkaline earth metals. Thus, the behavior of the rare earth metals cannot be predicted based upon the behavior of the transition metals or the alkaline earth metals.

SUMMARY OF THE PRESENT INVENTION

According to the present invention an improved fracturing fluid is provided for use in the hydraulic fracturing of subterranean formations. The fracturing fluid comprises an aqueous fluid containing an effective amount of a crosslinking agent to crosslink a gelling agent and a retarding agent for delaying the crosslinking reaction. Thus, the fracturing fluid of the present invention permits one to pump the fracturing fluid into the formation without excessive friction loss, while, at the same time, delaying the crosslinking reaction between the crosslinking agent and the gelling agent.

The gelling agents of the fracturing fluid of the present invention are guar containing compounds and the crosslinking agent is a rare earth metal salt, i.e. a ceric salt wherein the cerium has a +4 oxidation state. The retarding agent for the ceric containing compound (which is incorporated in an amount effective to provide the desired delayed crosslinking of the guar containing compounds) comprises a first mixture consisting essentially of about 1 part of a carboxylic acid and from about 1 to 1000 parts of an alkali metal salt of the carboxylic acid constituent employed. The amount of the first mixture employed to achieve the desired delay of crosslinking can vary widely, but will generally be an amount effective to provide from about 0.01 to about 0.5 weight percent of the first mixture, based on the total weight of the fluid.

The retarding agent of the present invention may further comprise an effective amount of a second mixture consisting essentially of about 1 part of a hydroxycarboxylic acid and from about 1 to 1000 parts of its alkali metal salt, or about 1 part of an aminocarboxylic acid and from about 1 to 1000 parts of its alkali metal salt. When formulating the retarding agent to include the second mixture, the amount of the second mixture employed can vary widely, but can constitute up to about 80 weight percent of the retarding agent so that when the retarding agent is incorporated into the gel, the second mixture will be present in an amount of up to about 0.1 weight percent, based on the total weight of the fluid.

An object of the present invention is to provide an improved composition for the hydraulic fracturing of subterranean formations wherein the rate of crosslinking of a gelling agent of the composition is controlled.

Another object of the present invention, while achieving the before-stated object, is to provide an improved fracturing fluid composition for the hydraulic fracturing of subterranean formations employing rare earth metal containing compounds as a crosslinking agent.

Another object of the invention, while achieving the before-stated objects, is to provide an improved fracturing fluid composition for the hydraulic fracturing of subterranean formations wherein the fracturing fluid composition possesses retardant crosslinking properties.

Still another object of the present invention, while achieving the before-stated objects, is to provide an improved method for hydraulic fracturing subterranean formations.

Other objects, advantages and features of the present invention will become clear upon reading the following detailed description when read in conjunction with appended claims.

DETAILED DESCRIPTION

The fracturing fluids of the present invention are multi-component systems comprising an aqueous fluid, a guar containing gelling agent, a rare earth metal containing crosslinking agent, i.e. a cerium containing crosslinking agent wherein the cerium has a +4 oxidation state, and a retarding agent capable of delaying the rate of crosslinking reaction of the guar containing gelling agent and the cerium containing crosslinking agent. The aqueous gels formulated of the before-described components have a non-Newtonian viscosity in laminar flow (such as in a subterranean formation) of from about 30 centipoise to about 1000 centipoise at 170 sec$^{-1}$ shear rate. However, when the aqueous gels are introduced into the formation via the bore hole the aqueous gels are in turbulent flow. Thus, it is desirable that the viscosity of the aqueous gels be no greater than the viscosity provided by the addition of the guar containing gelling agent before crosslinking with the cerium containing compound so that conventional pumping equipment can be utilized to introduce the fracturing fluids down hole into the subterranean formation.

The aqueous fluid component of the fracturing fluids of the present invention can be any suitable aqueous fluid heretofore employed in the art for formulating fracturing fluids. That is, the aqueous fluid can be water, a water-alcohol solution containing up to 80 weight percent alcohol, and the like. Examples of alcohols which have heretofore been employed in the preparation of fracturing fluids are methanol, ethanol, propanol, isopropanol, ethylene glycol, and the like.

The gelling agents useful in the practice of the present invention are the guar containing gelling agents. Such guar containing gelling agents are well known in the art, and include guar gum, sodium carboxymethylguar, hydroxyethylguar, sodium carboxymethylhydroxyethylguar, hydroxypropylguar, sodium carboxymethylhydroxypropylguar, and the like. The amount of the guar containing gelling agent used in the formulation of the fracturing fluids can vary widely, provided that a sufficient concentration of the gelling agent is present to permit effective crosslinking of the gel within the subterranean formation. Generally, the amount of the guar containing gelling agent present in the aqueous fluid will be in a concentration of from about 0.2 to about 1.25 percent by weight of the aqueous fluid.

The crosslinking compounds utilized to crosslink the guar containing gelling agents are rare earth metal containing compounds, such as water-soluble ceric containing compounds wherein the ceric constituent has a +4 oxidation state. Examples of such ceric containing compounds are ceric nitrate, ceric sulfate, ceric sulfate tetrahydrate, ceric ammonium nitrate, ceric ammonium sulfate dihydrate, and the like.

The amount of the ceric containing compound employed to crosslink the guar containing gelling agent can vary widely provided that an effective amount is employed to crosslink at least a portion of the guar gelling agent. However, the amount of the cerium metal in the +4 oxidation state contained in the crosslinking agent employed in the formulation of the fracturing fluids of the present invention will generally be present in an amount of from about 0.01 percent to about 0.05 percent, based on the weight of the fracturing fluid.

In formulating the compositions of the present invention it is desirable to admix the gelling agent with the aqueous fluid and thereafter introduce the crosslinking agent. The rate of the crosslinking reaction between the guar gelling agent and the water-soluble ceric containing compound is rapid at ambient temperatures; and almost instantaneous when subjected to temperatures above 100 degrees Fahrenheit. The rapid rate of the crosslinking reaction does not permit the gelled fluid to be pumped into the subterranean formation before a significant increase in the viscosity of the fluid occurs. Thus, excessive friction losses would be encountered in the pumping of a fluid containing only the aqueous liquid, the guar containing gelling agent and the water-soluble ceric containing compound.

In order to retard the rate of the crosslinking reaction between the guar gelling agent and the water-soluble ceric containing compound so that the fluid can be pumped into the subterranean formation without excessive friction losses, the fracturing fluid further comprises an effective amount of a retarding agent to delay crosslinking of the ceric containing compound with the guar gelling agent. The retarded aqueous gel can be introduced into the subterranean formation because of its relatively low initial viscosity. Further, by incorporating the retarding agent in predetermined amounts a composition can be produced which will delay the rate of the crosslinking reaction between the cerium containing compound and the guar containing gelling agent for a period of time sufficient to permit the pumping of the fracturing fluid into the subterranean formation.

The time of the delay can vary widely depending upon the amount of the retarding agent incorporated into the fracturing fluid, and the depth of the formation to be fractured. Further, the controlled crosslinking of the guar gelling agent with the water-soluble ceric containing compound permits one to control the crosslinking reaction so that as the fracturing fluid enters the subterranean formation the viscosity of the fracturing fluid increases and thus facilitates the fracturing process in the formation. However, because of the delayed crosslinking reaction the hydraulic horsepower required to effect the fracture is substantially reduced.

The retarding agents useful in the formulation of the fracturing fluids of the present invention comprise a first mixture consisting essentially of a carboxylic acid and an alkali metal salt of the carboxylic acid employed; and the retarding agent may further comprise an effective amount of a second mixture selected from the group consisting of a hydroxycarboxylic acid and its alkali metal salt, or an aminocarboxylic acid and its alkali metal salt. That is, the retarding agent can consist solely of the first mixture or a combination of the first mixture and up to about 80 weight percent of the second mixture.

When formulating the retarding agent solely of the first mixture, the amount of the first mixture employed can vary widely, but will generally be an amount effective to provide from about 0.01 to about 0.5 weight percent of the first mixture, based on the total weight of the fracturing fluid. On the other hand, when the retarding agent includes the second mixture, the amount of the second mixture admixed with the first mixture can be an amount effective to provide up to about 0.1 weight percent of the second mixture, based on the total weight of the fracturing fluid.

The amount of the carboxylic acid to its alkali metal salt employed in the formulating the first mixture constituent of the retarding agent can vary widely, but will generally be about 1 part of the carboxylic acid and from about 1 to 1000 parts of the alkali metal salt of the carboxylic acid. That is, the molar ratio of the alkali metal salt to the carboxylic acid can range from about 1 to 1000 parts of the alkali metal salt per part of the carboxylic acid.

Similarly, the amount of the hydroxycarboxylic acid, or the aminocarboxylic acid, to their respective alkali metal salts constituting the second mixture can vary widely, but will generally be from about 1 part of the carboxylic acid or the aminocarboxylic acid (as the case may be) to from about 1 to 1000 parts of the alkali metal salt of such acid. That is, the molar ratio of the alkali metal salt to the acid constituent of the second mixture can vary from about 1 to 1000 parts of the alkali metal salt constituent per part of the acid constituent.

The carboxylic acid employed in the formulation of the first mixture can be any suitable carboxylic acid represented by the structural formula

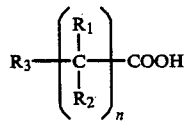

wherein:
n takes on an integral value of from 0 to about 3;
$R_1$ and $R_2$ are H when n is an integer of from 1 to about 3; and
$R_3$ is a moiety selected from the group consisting of H, $CH_3$, HOOCCHCH,

COOH.

Examples of carboxylic acids satisfying the above-described structural formula are acetic acid, propionic acid, fumaric acid, benzoic acid, pentanoic acid, butanoic acid, succinic acid, caprylic acid, and the like. The alkali metal salts of such carboxylic acids are well known and include sodium acetate, potassium acetate, sodium propionate, potassium propionate, lithium propionate, sodium fumarate, potassium benzoate, sodium pentanate, potassium pentanate, sodium butanate, sodium succinate, potassium succinate, lithium succinate, and the like.

The hydroxycarboxylic acids employed in the formation of the second mixture constituent of the retarding agent of the present invention are represented by the structural formula

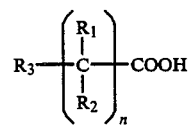

wherein:
n takes on an integral value of from 0 to about 4;
$R_1$ is a moiety selected from the group consisting of H and OH when n is an integer of from 1 to about 4;
$R_2$ is a moiety selected from the group consisting essentially of H, COOH and OH when n is an integer of from 1 to about 4, at least one of the moieties representing $R_1$ and $R_2$ being OH when n is an integer of from 1 to about 4; and
$R_3$ is a moiety selected from the group consisting of $CH_3$, COOH, $CH_{20}H$ and $C_5H_6(OH)_4$.

Examples of hydroxycarboxylic acids satisfying the above identified structural formula are citric acid, lactic acid, maleic acid, tartaric acid, gluconic acid, ascorbic acid, alpha-keto-gluconic acid, iso-ascorbic acid, and the like. The term hydroxy-carboxylic acid as used herein is to be understood to mean mono-, di-, and polyhydroxycarboxylic acids, and the alkali metal salts of such acids.

Illustrative of the alkali metal salts of the hydroxycarboxylic acids are sodium citrate, potassium citrate, sodium lactate, sodium maleate, potassium maleate, sodium tartarate, potassium tartarate, sodium gluconate, lithium gluconate, potassium gluconate, sodium alpha-keto-gluconate, potassium alpha-ketogluconate, sodium iso-ascorbate, and the like.

The aminocarboxylic acids which can be employed in the formulation of the second mixture are represented by the structural formula

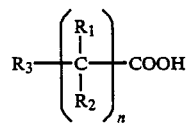

wherein:
n takes on an integral value of from 0 to about 3;
$R_1$ is H when n is an integer of 1;
$R_2$ is a moiety selected from the group consisting of H CH OH $CH_3$, $(H_3C)_2CH$, $CH(OH)CH_3$ and

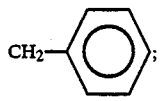

and $R_3$ is a moiety selected from the group consisting of $NH_2$ and

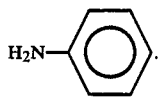

Examples of aminocarboxylic acids satisfying the above-identified structural formula are glycine, serine, alanine, para-aminobenzoic acid, valine, threonine, phenylalanine, and the like. Similarly, the alkali metal salts of such aminocarboxylic acids include sodium glycinate, potassium glycinate, lithium serinate, sodium serinate, potassium alaninate, sodium para-aminobenzoate, potassium valinate, sodium valinate, sodium threoninate, potassium phenylalaninate, sodium phenylalaninate, and the like.

The retarding agents of the fracturing fluids of the present invention are admixed with the aqueous fluid to provide a controlled delay in the crosslinking rate of the ceric containing compound upon the guar containing gelling agent. Thus, one can readily introduce into the subterranean formation an effective amount of the fracturing fluid constituting the aqueous gel at a flow rate and pressure sufficient to produce a fracture in the formation. Such techniques of introducing the aqueous gel into the subterranean formation are well known, and thus are not believed necessary to be set out in further detail for one to understand and appreciate the subject invention.

The fracturing fluids of the present invention can be prepared by any conventional method. For example, the fracturing fluids can be prepared by mixing a predetermined quantity of the guar containing gelling agent and the retarding agent with a quantity of aqueous fluid to form a solvated gel. Any conventional batch mixing apparatus can be employed in the admixing of the guar containing gelling agent, the retarding agent, and the aqueous fluid. After the gelling agent, retarding agent and aqueous fluid have been mixed for time sufficient to substantially dissolve the retarding agent and form a "base" gel, a predetermined amount of the crosslinking agent is mixed with the base gel. The mixture can then be pumped into the well bore for delivery into the formation where the retarded crosslinking reaction between the guar containing gelling agent and the water-soluble ceric containing compound occurs. Proppants can be added to the gel prior to introduction of the crosslinking agent if desired, or as the gel is introduced into the well bore.

A fracturing fluid having a pH of from 4 to 5 is useful for fracturing subterranean formations. The fracturing fluids of the present invention, because of the unique combination of components, are provided with a pH of about 2 to about 6, and more desirably from about 4 to about 5. However, if desired, the pH can be varied by the addition of caustic materials, such as KOH, NaOH and the like without adversely effecting the desired delayed crosslinking properties of the composition of the present invention.

After the fracturing fluid, i.e the gel, has been pumped into the subterranean formation and a fracture has been formed, it is desirable that the gel be broken so that the fluid can be removed from the subterranean formation. The gels produced by the compositions of the present invention can be broken using conventional methods wherein the gel is converted into a low viscosity fluid for recovery from the formation. The breaking of gels of fracturing fluids used in the fracturing of subterranean formations are well known in the art and include the exposure of the gel to high temperatures for a period of time, or incorporation of gel breakers into the composition, such as enzymes and the like.

In order to more fully describe the fracturing fluid compositions of the present invention, the following examples are set forth. However, it is to be understood that the examples are for illustrative purposes only and are not intended to limit the scope of the present invention as defined in the appended claims.

EXAMPLE I

A series of experiments were conducted using selected concentrations of five additives, namely, glycol, glyoxal, sorbitol, acetylacetonate and triethanolamine to determine the effect of such additives on delayed crosslinking when added to a base gel containing hydroxypropylguar prior to ceric nitrate addition. The base gel contained 40 pounds of the hydroxypropylguar per 1000 gallons of water.

In each experiment selected concentrations of the additives were blended into 250 ml aliquots of the base gel maintained at 70 degrees Fahrenheit. The resulting blend was then placed on a Model 35 Fann Viscometer, (Standard Bob, #1 spring, 300 RPM) and the apparent viscosity values were recorded at one minute intervals. Prior to each experiment the pH of the base gel was adjusted with caustic to insure a final pH in the test solution of about 4.3, the preferred crosslinking pH range for ceric nitrate.

Delayed crosslinking of the ceric nitrate and hydroxypropyl guar did not occur. While the additives appeared to inhibit the crosslinking reaction, such additives did not function in a ligand exchange manner necessary to achieve a delayed crosslink reaction.

EXAMPLE II

A series of experiments were conducted to determine if a delayed crosslink of a guar containing gelling agent and a ceric containing compound could be obtained by raising the pH of the test solutions from 2 to 4, after addition of the crosslinking agent.

Several base materials were evaluated as agents to slowly raise the pH from 2 to 4. The delayed base was placed in 250 ml of an aqueous base gel formulated of 50 pounds of hydroxypropylguar to which was added 2 gallons of ceric nitrate/mgal. The mixture was then placed in a water bath set at 140 degrees Fahrenheit and the properties of the gel observed with time (Table 1).

The material which best demonstrates the principle of a delayed base was a prepared sample of paraffin coated KOH. As the material is heated within the gel the pH increases initiating a good complexed gel.

TABLE 1

EFFECT OF 10 lb PARAFFIN COATED KOH ON THE CERIUM NITRATE CROSSLINKING REACTION OF A 50 lb HP GUAR

| TIME | TEMPERATURE | VISCOSITY | pH |
|---|---|---|---|
| 1 | 71 | 52 | 2.1 |
| 0 | 71 | 52 | 2.1 |
| 1 | 100 | 40 | 2.1 |
| 2 | 110 | 58 | 2.8 |
| 3 | 115 | 60 | 3.2 |
| 4 | 120 | 80 | 3.8 |
| 5 | 120 | 115 | 4.1 |
| 10 | 120 | 115 | 5.6 | ceric nitrate). The data is presented in Table 3. The blender speed was adjusted to provide a vortex and a minimum of air entrainment.

Discussion

As the data was acquired it became obvious that the oxidizer properties were dominating the observed results. The color changes are known to be diagnostic for these reactions where $Ce^{+4}$ is reduced to $Ce^{+3}$. Multifunctional carboxylate compounds undergo a facile decarboxylation ($CO_2$ evolution) and alcohols simply reduce the metal (see Tables 2 and 4). Of the potential ligands tested, only acetic acid was relatively inert to oxidation.

TABLE 2

DELAYED CROSSLINKER FORMULATIONS

| | Cerium Source | Amount (gm) | Water (gm) | IPA (gm) | Glyoxal (gm) | Lactic Acid (gm) | Acetic Acid (gm) | Comment |
|---|---|---|---|---|---|---|---|---|
| I | $Ce(NO_3)_6 2NH_4$ | 5.5 | 5.5 | — | 0.9 | — | — | a. |
| II | $Ce(NO_3)_6 2NH_4$ | 5.5 | 5.5 | 1.2 | 0.9 | — | — | a. |
| III | $Ce(NO_3)_6 2NH_4$ | 5.5 | 5.5 | 1.2 | 1.8 | — | — | a. |
| IV | $Ce(NO_3)_4$ | 3.8 | — | — | — | — | 0.6 | no apparent color change |
| V | $Ce(NO_3)_4$ | 3.8 | — | — | — | — | 1.2 | no apparent color change |
| VI | $Ce(NO_3)_4$ | 3.8 | — | .24 | — | — | — | a. |
| VII | $Ce(NO_3)_4$ | 3.8 | — | — | — | 0.9 | — | a. |
| VIII | $Ce(SO_4)_2$ | 3.2 | 1.2 | — | — | — | — | precipate |
| IX | $Ce(NO_3)_4$ | 3.8 | — | — | — | — | — | 0.6 gm dimethoxy ethane |
| X | $Ce(SO_4)_2$ | 4.3 | — | — | — | 0.9 | — | a. |
| XI | $Ce(SO_4)_2$ | 4.3 | — | — | — | 1.8 | — | a. | a. As the liquid is added, the mixture takes on a distinct reddish-brown color. After being placed in a 140° F. water bath the solution turns pink and then colorless. Extended heating produces a yellow color and acrid smelling, dark fumes are released when the sample is shaken and opened.

TABLE 3

CROSSLINKER EVALUATION RESULTS

| Crosslinker Sample | Amount used (ml) | Fluid (pH) | Results at RT | Results at 140° F. |
|---|---|---|---|---|
| $Ce(NO_3)_6 \cdot 2NH_4$[a] | 0.25 | 3.7 | Instant Crosslink | — |
| I | 0.29 | 5.7 | Negative | Negative |
| II | 0.36 | — | Negative | Negative |
| III | 0.38 | — | Negative | Negative |
| $Ce(NO_3)_4$ | 0.23 | 2.55 | Instant Crosslink | — |
| IV | 0.26 | 2.5 | Instant Crosslink | — |
| IV[b] | 0.26 | 2.5 | Instant Crosslink | — |
| V | 0.3 | — | Instant Crosslink | — |
| VI[c] | 0.3 | — | Instant Crosslink | — |
| VII | 0.37 | 3.1 | Negative | Negative |
| VIII | 0.26 | 3.0 | Negative | Negative |
| IX | 0.52 | 3.2[d] | Negative | Negative |
| X | 0.25 | — | Instant Complex | — |
| XI | 0.25 | — | Negative | Negative |
| XII | 0.6 | — | Negative | Negative |
| XIII | 0.6 | — | Negative | Negative |
| $Ce(SO_4)_2$ | 0.2 | 2.44 | Negative | Negative |
| $Ce(SO_4)_2$[e] | 0.5 | 3.25 | Instant Complex | — |

[a] dissolved 1:1 w/w in water
[b] aged crosslinker for 2 hr @ 140° F.
[c] aged crosslinker for 30 min. @ 140° F.
[d] additional KOH added to raise pH
[e] added 10 lb/1000 gal sodium diacetate for pH buffer

EXAMPLE III

A series of experiments were conducted wherein various compounds containing $Ce^{+4}$ metal were reacted with ligands in an attempt to prepare a delayed crosslinking agent (see Table 2). The characteristics of the formulated materials were evaluated using a 50 lb/1000 gal hydroxypropylguar gel. The pH was adjusted to approximately 7.5 with HCl and the crosslinking agent was added to 250 ml of the gel in a Waring Blendor (equivalent of 1 gal/mgal of the concentrated

TABLE 4

EXPLORATION OF REACTION WITH VARIOUS LIGANDS WITH 3.8 gm $Ce(NO_3)_4$

| Ligand | Amount | Room Temperature | 140° F. |
|---|---|---|---|
| Acetyl acetonate | 0.12 | decolorized | — |
| EDTA | 0.1 | decolorized | — |
| Citric Acid | 0.16 | decolorized | — |
| Acetone | 1.2 | turned red | decolorized |

EXAMPLE IV

A series of experiments were conducted wherein 250 ml of 50 lb/1000 gal hydroxypropylguar gel and selected amount of pH control additives were admixed. The pH was adjusted to the indicated pH with 15% KOH. The crosslinking agent was added to the eye of the vortex. Those samples exhibiting a delayed crosslinking reaction were left in the blender 5 minutes. The sample was divided and placed static at room temperature and 140 degrees Fahrenheit to observe for crosslinking.

The viscosity properties were evaluated by adding the crosslinking agent to a base gel under two different conditions. First the properties were examined immediately after crosslinking in a Waring Blendor and secondly the crosslinking agent was added while the base gel was being circulated with a JABSCO pump and transferred after 4 min. shear to the Model 50 Viscometer. After 5 minutes the preheated 140 degree Fahrenheit bath was raised and the viscosity profile was determined.

Discussion

Previous attempts to modify the unacceptable low pH resulting from crosslinking agent addition were achieved by either raising the base gel pH to above 8 or by post addition of KOH or caustic. Both procedures would be acceptable in field operations. Data in Table 5 indicates that the gel could be loaded with acetate buffer to achieve the desired final pH and still be acceptable from a field standpoint. The buffer package was further modified by the addition of sodium lactate and delayed properties were observed at that point.

TABLE 5

EXAMINATION OF BUFFERED GELS

| Cross-linker | Amount gal/ 1000 gal | Constituent No. 1[a] lb/ 1000 gal | Constituent No. 2[b] gal/ 1000 gal | Base Gel pH | Cross-linked pH | Room Temperature | 140° F. | Comments |
|---|---|---|---|---|---|---|---|---|
| $Ce(SO_4)_2$ | 2.0 | 10 | — | 4.5 | 3.25 | Instant crosslink | Loses most crosslink character | Smooth weak crosslink |
| $Ce(SO_4)_2$ | 2.0 | — | 4.0 | 4.92 | 3.99 | Negative | Negative | Turned yellow when crosslinker added |
| $Ce(SO_4)_2$ | 2.0 | — | 2.0 | 4.72 | 3.52 | Negative | Negative | |
| $Ce(SO_4)_2$ | 2.0 | — | 1.0 | 6.36[c] | 3.38 | Negative | Negative | |
| $Ce(SO_4)_2$ | 2.0 | — | 0.4 | 9.0[c] | 3.24 | Negative | | Tried to complex |
| $Ce(SO_4)_2$ | 2.0 | 10 | 0.2 | 5.3[c] | NM | Attempted to crosslink | — | |
| $Ce(NO_3)_4$ | 1.0 | 10 | 0.4 | 5.4 | 4.17 | Negative | Crosslinked | |
| $Ce(NO_3)_4$ | 1.0 | 10 | 0.8 | 5.65 | NM | Negative for 1 hour | Crosslinked in 30 minutes | |
| $Ce(NO_3)_4$ | 1.5 | 17.5 | — | 6.0[c] | 4.5 | Negative for 5 minutes | Crosslinked rapidly | |

[a]Mixture containing 50% acetic acid and 50% sodium acetate
[b]Aqueous solution containing 60% sodium lactate by weight
[c]additional KOH added
NM = not measured The above data clearly indicates that a retarding agent comprising (a) a first mixture consisting essentially of a carboxylic acid and an alkali metal salt of the carboxylic acid as heretofore described and when incorporated into a gel in an amount sufficient to provide from about 0.01 to about 0.5 weight percent of the first mixture (based on the total weight of the fracturing fluid); and (b) up to about 80 weight percent of a second mixture consisting essentially of a hydroxycarboxylic acid and an alkali metal salt of the hydroxycarboxylic acid, or an aminocarboxylic acid and an alkali metal salt of the aminocarboxylic acid as heretofore described and when incorporated into a gel in an amount sufficient to provide up to about 0.1 weight percent of the second mixture (based on the total weight of the fracturing fluid), provides the necessary pH control and ligand exchange rate necessary to delay the crosslinking action of a $Ce^{+4}$ containing compound with a guar containing gelling agent. Further, the data indicates that the delayed ceric nitrate system has an increase in apparent viscosity with temperature even after shearing the material, such as with a JABSCO pump.

It is clear that the present invention is well adapted to carry out the objects and attain the ends and advantages mentioned therein as well as those inherent in the invention. While presently preferred embodiments of the invention have been described for purposes of this disclosure, numerous changes may be made which will readily suggest themselves to those skilled in the art and which are accomplished within the spirit of the invention disclosed and as defined in the appended claims.

What is claimed is:

1. A retarding agent for delaying crosslinking of a guar gelling agent of an aqueous gel wherein a rare earth metal containing compound is utilized as a crosslinking agent and wherein the rare earth metal of the compound is a ceric moiety having a +4 oxidation state, the retarding agent comprising:

a first mixture containing about 1 part of a carboxylic acid and about 1 to 1000 parts of an alkali metal salt of the carboxylic acid, the carboxylic acid represented by a structural formula

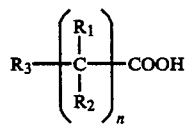

wherein:
n takes on an integral value of from 0 to about 3;
$R_1$ and $R_2$ are H when n is an integer of from 1 to about 3; and
$R_3$ is a moiety selected from the group consisting of H, $CH_3$, HOOCCHCH,

COOH.

2. The retarding agent of claim 1 wherein the carboxylic acid is selected from the group consisting of acetic acid, propionic acid, fumaric acid, benzoic acid, pentanoic acid, butanoic acid and succinic acid.

3. The retarding agent of claim 1 further comprising:
up to about 80 weight percent of a second mixture selected from the group consisting of a hydroxycarboxylic acid and an alkali metal salt of the hydroxycarboxylic acid, or an aminocarboxylic acid and an alkali metal salt of the aminocarboxylic acid, the second mixture containing about 1 part of the hydroxycarboxylic acid or the animocarboxylic acid and from about 1 to 1000 parts of the alkali metal salt of the acid utilized in the formulation of the second mixture, the hydroxycarboxylic acid represented by the structural formula

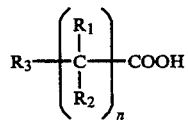

wherein:
n takes on an integral value of from 0 to about 4;
$R_1$ is a moiety selected from the group consisting of H and OH when n is an integer of from 1 to about 4;
$R_2$ is a moiety selected from the group consisting essentially of H, COOH and OH when n is an integer of from 1 to about 4, at least one of the moieties representing $R_1$ and $R_2$ being OH when n is an integer of from 1 to about 4; and
$R_3$ is a moiety selected from the group consisting of $CH_3$, COOH, $CH_2OH$ and $C_5H_6(OH)_4$;
the aminocarboxylic acid represented by a structural formula

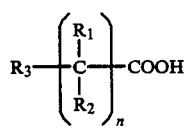

wherein:
n takes on an integral value of from 0 to about 3;
$R_1$ is H when n is an integer of 1;
$R_2$ is a moiety selected from the group consisting of H, $CH_2OH$, $CH_3$, $(H_3C)_2CH$, $CH(OH)CH_3$ and

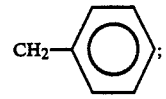

and
$R_3$ is a moiety selected from the group consisting of $NH_2$ and

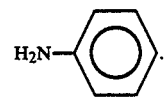

4. The retarding agent of claim 3 wherein the hydroxycarboxylic acid is selected from the group consisting of citric acid, lactic acid, maleic acid, tartaric acid, gluconic acid, ascorbic acid, alpha-ketogluconic acid, and iso-ascorbic acid.

5. The retarding agent of claim 3 wherein the aminocarboxylic acid is selected from the group consisting of glycine, serine, alanine, paraaminobenzoic acid, valine, threonine, and phenylalanine.

6. The retarding agent of claim 1 wherein the carboxylic acid and its alkali metal salt employed in the formulation of the first mixture are acetic acid and sodium acetate.

7. The retarding agent of claim 6 further comprising:
up to about 80 weight percent of a second mixture containing about 1 part of a hydroxycarboxylic acid and about 1 to 1000 parts of an alkali metal salt of the hydroxycarboxylic acid, and wherein the hydroxycarboxylic acid is lactic acid and the alkali metal salt thereof is sodium lactate.

8. A fluid composition for use in fracturing subterranean formations, the fluid composition having a pH value of from about 4 to about 5 and comprising:
an aqueous fluid;
an effective amount of a guar containing gelling agent to gel the fluid;
an effective amount of a water-soluble ceric containing compound to crosslink at least a portion of the guar gelling agent, the ceric constituent having a +4 oxidation state; and
an effective amount of a retarding agent to delay action of the ceric containing compound upon the guar gelling agent, the retarding agent comprising:
a first mixture containing about 1 part of a carboxylic acid and about 1 to 1000 parts of an alkali metal salt of the carboxylic acid, the carboxylic acid represented by a structural formula

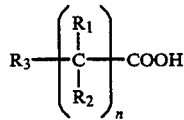

wherein:
n takes on an integral value of from 0 to about 3;
$R_1$ and $R_2$ are H when n is an integer of from 1 to about 3; and $R_3$ is a moiety selected from the group consisting of H, CH$_3$, HOOCCHCH,

,

COOH, the first mixture being present in an amount sufficient to provide from about 0.01 to about 0.5 weight percent of the first mixture in the gel, based on the total weight of the fluid composition.

9. The fluid composition of claim 8 wherein the carboxylic acid is selected from the group consisting of acetic acid, propionic acid, fumaric acid, benzoic acid, pentanoic acid, butanoic acid and succinic acid.

10. The fluid composition for use in fracturing subterranean formations of claim 8 wherein the retarding agent further comprises:

up to about 80 weight percent of a second mixture selected from the group consisting of a hydroxycarboxylic acid and an alkali metal salt of the hydroxycarboxylic acid, or an aminocarboxylic acid and an alkali metal salt of the aminocarboxylic acid, the second mixture containing about 1 part of the hydroxycarboxylic acid or the aminocarboxylic acid and from about 1 to 1000 parts of the alkali metal salt of the acid utilized in the formation of the second mixture, the second mixture being present in an amount sufficient to provide up to about 0.1 weight percent of the second mixture based on the total weight of the fluid composition, the hydroxycarboxylic acid represented by a structural formula

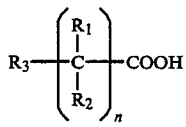

wherein:

n takes on an integral value of from 0 to about 4;

$R_1$ is a moiety selected from the group consisting of H and OH when n is an integer of from 1 to about 4;

$R_2$ is a moiety selected from the group consisting essentially of H, COOH and OH when n is an integer of from 1 to about 4, at least one of the moieties representing $R_1$ and $R_2$ being OH when n is an integer of from 1 to about 4; and $R_3$ is a moiety selected from the group consisting of CH$_3$, COOH, CH$_2$OH and C$_5$H$_6$(OH)$_4$;

the aminocarboxylic acid represented by a structural formula

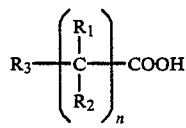

wherein:

n takes on an integral value of from 0 to about 3;

$R_1$ is H when n is an integer of 1;

$R_2$ is a moiety selected from the group consisting of H, CH$_2$OH, CH$_3$, (H$_3$C)$_2$CH, CH(OH)CH$_3$ and

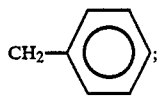;

and $R_3$ is a moiety selected from the group consisting of NH$_2$ and

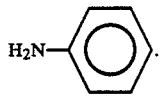.

11. The fluid composition of claim 10 wherein the second mixture consists essentially of a hydroxycarboxylic acid and its alkali metal salt, and wherein the hydroxycarboxylic acid is selected from the group consisting of citric acid, lactic acid, maleic acid, tartaric acid, gluconic acid, ascorbic acid, alpha-keto-gluconic acid, and iso-ascorbic acid.

12. The fluid composition of claim 10 wherein the second mixture consists essentially of an aminocarboxylic acid and its alkali metal salt, and wherein the aminocarboxylic acid is selected from the group consisting of glycine, serine, alanine, paraaminobenzoic acid, valine, threonine, and phenylalanine.

13. The fluid composition of claim 10 wherein the guar containing gelling agent is present in an amount of from about 0.2 to about 1.25 weight percent, based on the weight of the aqueous fluid, and wherein the guar containing gelling agent is selected from the group consisting of guar gum, sodium carboxymethylguar, hydroxyethylguar, sodium carboxymethylhydroxyethylguar, hydroxypropylguar and sodium carboxymethylhydroxypropylguar.

14. The fluid composition of claim 13 wherein the effective amount of the ceric containing compound to crosslink the guar gelling agent is from about 0.01 to about 0.05 weight percent.

15. The fluid composition of claim 14 wherein the ceric containing compound is selected from the group consisting of ceric nitrate, ceric sulfate, ceric sulfate tetrahydrate, ceric ammonium nitrate and ceric ammonium sulfate dihydrate.

16. The fluid composition of claim 10 wherein the ceric containing compound is selected from the group consisting of ceric nitrate, ceric sulfate, ceric sulfate tetrahydrate, ceric ammonium nitrate and ceric ammonium sulfate dihydrate.

17. The fluid composition of claim 16 wherein the guar containing gelling agent is present in an amount of from about 0.2 to about 1.25 weight percent, based on the weight of the fluid composition, and wherein the guar containing gelling agent is selected from the group consisting of guar gum, sodium carboxymethylguar, hydroxyethylguar, sodium carboxymethylhydroxyethylguar, hydroxypropylguar and sodium carboxymethylhydroxypropylguar.

18. The fluid composition of claim 17 wherein the carboxylic acid and the alkali metal salt of the carboxylic acid employed to formulate the first mixture are acetic acid and sodium acetate.

19. The fluid composition of claim 18 wherein the retarding agent further comprises up to about 80 weight percent of a hydroxycarboxylic acid and an alkali metal salt of the hydroxycarboxylic acid, and wherein the hydroxycarboxylic acid and its alkali metal salt are lactic acid and sodium lactate.

20. A process for fracturing a subterranean formation which comprises:
introducing into the formation an effective amount of an aqueous gel at a flow rate and pressure sufficient to produce a fracture, the aqueous gel comprising:
an aqueous fluid;
an effective amount of a guar containing gelling agent to gel the fluid;
an effective amount of a rare earth metal containing water-soluble compound to crosslink at least a portion of the guar gelling agent, the rare earth constituent of the water-soluble compound being ceric in a +4 oxidation state; and
an effective amount of a retarding agent to delay action of the ceric containing compound upon the guar gelling agent, the retarding agent comprising:
a first mixture containing about 1 part of a carboxylic acid and about 1 to 1000 parts of an alkali metal salt of the carboxylic acid, the carboxylic acid having a general structural formula

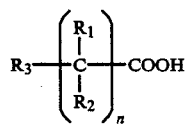

wherein:
n takes on an integral value of from 0 to about 3;
$R_1$ and $R_2$ are H when n is an integer of from 1 to about 3; and
$R_3$ is a moiety selected from the group consisting of H, $CH_3$, HOOCCHCH,

COOH, the first mixture being present in an amount of from about 0.01 to about 0.5 weight percent, based on the total weight of the aqueous gel.

21. The process of claim 20 wherein the carboxylic acid is selected from the group consisting of acetic acid, propionic acid, fumaric acid, benzoic acid, pentanoic acid, butanoic acid and succinic acid.

22. The process of claim 20 wherein the retarding agent further comprises:
up to 80 weight percent of a second mixture selected from the group consisting of a hydroxycarboxylic acid and an alkali metal salt of the hydroxycarboxylic acid, or an aminocarboxylic acid and an alkali metal salt of the aminocarboxylic acid, the second mixture containing from about 1 part of the hydroxycarboxylic acid or the aminocarboxylic acid and from about 1 to 1000 parts of the alkali metal salt of the acid utilized in the formation of the second mixture, the hydroxycarboxylic acid represented by a general structural formula

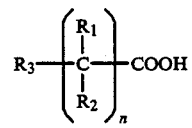

wherein:
n takes on an integral value of from 0 to about 4;
$R_1$ is a moiety selected from the group consisting of H and OH when n is an integer of from 1 to about 4;
$R_2$ is a moiety selected from the group consisting essentially of H, COOH and OH when n is an integer of from 1 to about 4, at least one of the moieties representing $R_1$ and $R_2$ being OH when n is an integer of from 1 to about 4; and
$R_3$ is a moiety selected from the group consisting of $CH_3$, COOH, $CH_2OH$ and $C_5H_6(OH)_4$;
the aminocarboxylic acid represented by a general structural formula

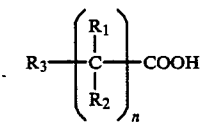

wherein:
n takes on an integral value of from 0 to about 3;
$R_1$ is H when n is an integer of 1;
$R_2$ is a moiety selected from the group consisting of H, $CH_2OH$, $CH_3$, $(H_3C)_2CH$, $CH(OH)CH_3$ and

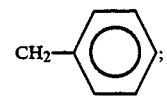

and
$R_3$ is a moiety selected from the group consisting of $NH_2$ and

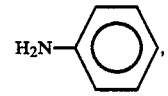

the second mixture being present in an amount up to about 0.1 weight percent, based on the total weight of the aqueous gel.

23. The process of claim 22 wherein the second mixture is a hydroxycarboxylic acid and its alkali metal salt, and wherein the hydroxycarboxylic acid is selected from the group consisting of citric acid, lactic acid, maleic acid, tartaric acid, gluconic acid, ascorbic acid, alpha-keto-gluconic acid, and isoascorbic acid.

24. The process of claim 22 wherein the second mixture is an aminocarboxylic acid and its alkali metal salt, and wherein the aminocarboxylic acid is selected from the group consisting of glycine, serine, alanine, para-aminobenzoic acid, valine, threonine, and phenylalanine.

25. The process of claim 20 wherein the guar containing gelling agent is present in an amount of from about 0.2 to about 1.25 weight percent and wherein the guar containing gelling agent is selected from the group consisting of guar gum, sodium carboxymethylguar, hydroxyethylguar, sodium carboxymethylhydroxyethylguar, hydroxypropylguar and sodium carboxymethylhydroxypropylguar.

26. The process of claim 25 wherein the effective amount of the ceric containing compound employed to crosslink at least a portion of the guar gelling agent is from about 0.01 to about 0.05 weight percent.

27. The process of claim 26 wherein the ceric containing compound is selected from the group consisting of ceric nitrate, ceric sulfate, ceric sulfate tetrahydrate, ceric ammonium nitrate and ceric ammonium sulfate dihydrate.

28. The process of claim 20 wherein the carboxylic acid and the alkali metal salt of the carboxylic acid of the first mixture are acetic acid and sodium acetate.

29. The process of claim 28 wherein the retarding agent further comprises up to 80 weight percent of a hydroxycarboxylic acid and its alkali metal salt, the hydroxycarboxylic acid and its alkali metal salt being present in an amount of from about 1 part of the hydroxycarboxylic acid to from about 1 to 1000 parts of its alkali metal salt, and wherein the hydroxycarboxylic acid and its alkali metal salt are lactic acid and sodium lactate.

* * * * *

UNITED STATES PATENT AND TRADEMARK OFFICE
CERTIFICATE OF CORRECTION

PATENT NO. : 4,960,527
DATED : October 2, 1990
INVENTOR(S) : Glenn S. Penny

It is certified that error appears in the above-identified patent and that said Letters Patent is hereby corrected as shown below:

Column 6, line 35, delete "$CH_{2O}H$" and substitute therefor --$CH_2OH$--; and Column 6, line 68, delete "CH OH" and substitute therefor --$CH_2OH$,--.

Signed and Sealed this

Ninth Day of June, 1992

Attest:

DOUGLAS B. COMER

*Attesting Officer*  *Acting Commissioner of Patents and Trademarks*